(12) United States Patent
Stepenoff et al.

(10) Patent No.: US 7,892,432 B2
(45) Date of Patent: Feb. 22, 2011

(54) ORGANIC WASTE TREATMENT USING ANAEROBIC AND FACULTATIVE ANAEROBIC BACTERIA

(75) Inventors: Gary F. Stepenoff, Phoenix, AZ (US); G. Scott Stepenoff, Phoenix, AZ (US)

(73) Assignee: Integrated Organic Energy, LLC, Goodyear, AZ (US)

( * ) Notice: Subject to any disclaimer, the term of this patent is extended or adjusted under 35 U.S.C. 154(b) by 169 days.

(21) Appl. No.: 12/378,442

(22) Filed: Feb. 12, 2009

(65) Prior Publication Data
US 2009/0206029 A1 Aug. 20, 2009

Related U.S. Application Data

(60) Provisional application No. 61/065,911, filed on Feb. 15, 2008.

(51) Int. Cl.
*C02F 3/00* (2006.01)
(52) U.S. Cl. ..................................... 210/613
(58) Field of Classification Search ......... 210/612–613, 210/605, 630
See application file for complete search history.

(56) References Cited

U.S. PATENT DOCUMENTS 5,846,425 A * 12/1998 Whiteman .................. 210/606
6,660,163 B2 * 12/2003 Miklos ........................ 210/605
6,893,567 B1 * 5/2005 Vanotti et al. ................ 210/605

* cited by examiner

*Primary Examiner*—Chester T Barry
(74) *Attorney, Agent, or Firm*—Tod R. Nissle, P.C.

(57) ABSTRACT

A method to prepare an organic composition for a digestor minimizes injury to and enhance the decomposition function of anaerobic and facultative anaerobic bacteria in the organic composition. The method is utilizes at an animal processing facility. Manure produced at the facility is periodically collected at least seven day intervals and at a temperature greater than thirty-two degrees F. Large pieces of inorganic material are removed from the manure while preserving a significant proportion of the living anaerobic and facultative anaerobic bacteria in the manure. The decomposition activity of anaerobic and facultative anaerobic bacteria is facilitated by, at a temperature in the range of fifty degrees F to one hundred and five degrees F, adding water to produce a slurry including seventy-five to ninety-five percent by weight water and twenty-five to five percent by weight of organic material. Organic material in the slurry is separated into particles having a length in the range of one micron to one-eighth of an inch. Inorganic material is removed from the slurry at a temperature in the range of fifty degrees F to ninety degrees F and while preserving the living anaerobic and facultative bacteria in the slurry to produce a slurry product comprised of less than twenty-five percent by weight of said organic material. The slurry product is transported to a digestor. The anaerobic and facultative anaerobic bacteria in the slurry product to decompose in the digestor organic material in the slurry product.

1 Claim, 1 Drawing Sheet

ORGANIC WASTE TREATMENT USING ANAEROBIC AND FACULTATIVE ANAEROBIC BACTERIA

Figure 1:
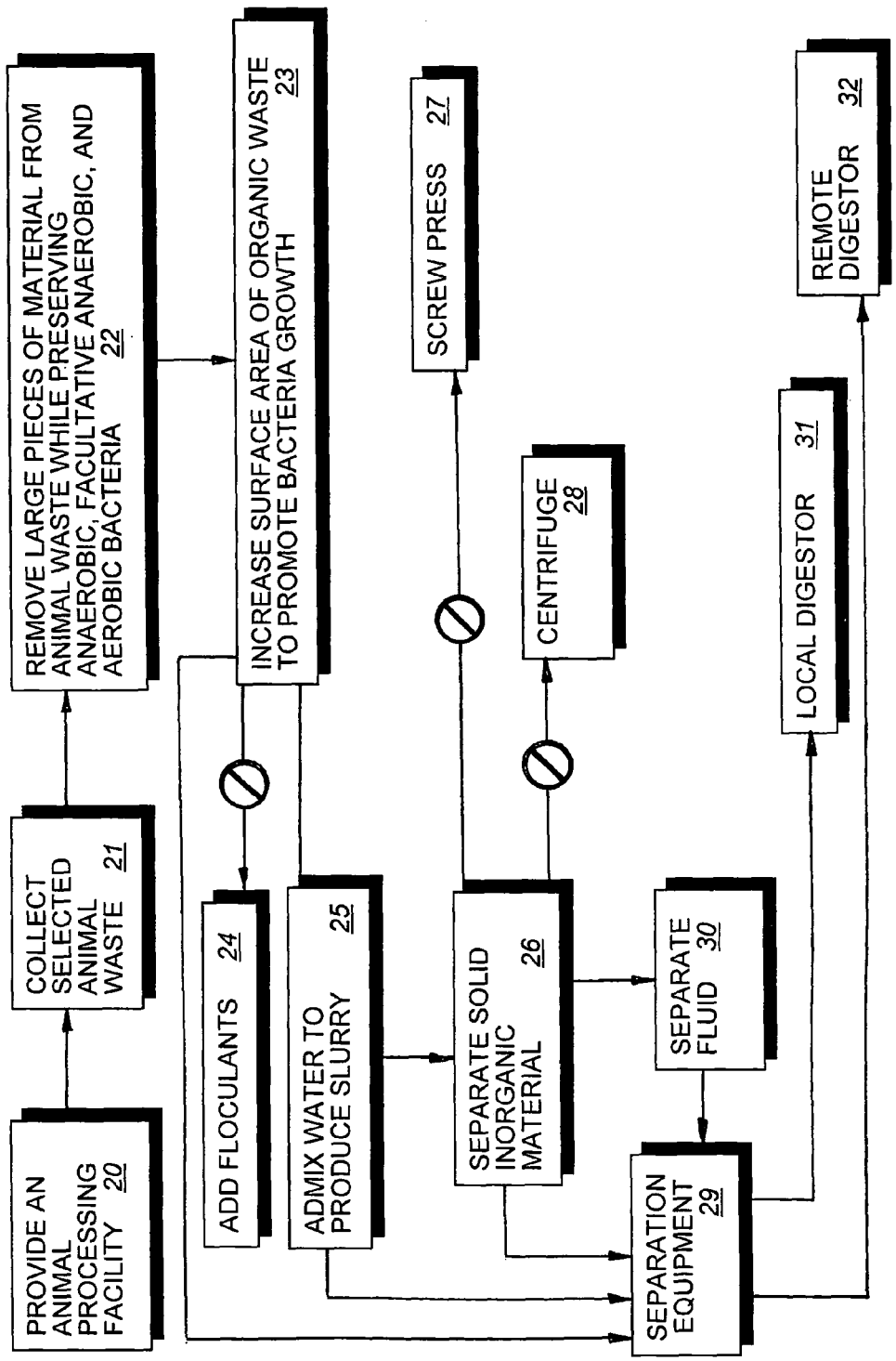

This application claims priority based on the provisional patent application Ser. No. 61/065,911, filed Feb. 15, 2008.

This invention pertains to processes utilizing anaerobic, facultative anaerobic, and aerobic bacteria to decompose organic waste.

More particularly, the invention relates to an improved process to facilitate the decomposition of organic waste by anaerobic and facultative anaerobic bacteria.

Cattle manure typically includes bacteria species of *Lactobacillus, Clostridium*, and *Bacillus. E-coli* gives manure a disagreeable odor. Digestors have long been utilized to facilitate the decomposition of cattle manure and the manure of other animals. Conventional digesters includes plug flow, complete mixed, hybrid of mixed and plug flow, upflow sludge bed anaerobic digesters, and expanded granular sludge bed (EGDB) reactors. Improving the efficiency of such digestors has, for many years, been an objective of those of skill in the art.

Accordingly, it would be highly desirable to provide a system to improve the efficiency of digesters.

Therefore, it is a principal object of the invention to provide an improved processing system to facilitate the decomposition of organic waste with bacteria.

This, and other and further objectives of the invention will be apparent to those skilled in the art from the following detailed description thereof, taken in conjunction with the drawings, in which:

FIG. 1 is a block flow diagram illustrating a presently preferred embodiment of the invention.

Briefly, in accordance with the invention, we provide an improved method for preparing an organic composition for a digestor to minimize injury to and enhance the decomposition function of anaerobic bacteria and facultative anaerobic bacteria in the organic composition. The method comprises the steps of providing an animal processing facility; periodically collecting at at least seven days intervals and at an ambient temperature greater than thirty-two degrees manure produced at the animal processing facility, the manure including organic material, inorganic material, and living anaerobic and facultative anaerobic bacteria that function to decompose the organic material; removing, while preserving a significant proportion of the living anaerobic and facultative anaerobic bacteria in the collected manure, large pieces of the inorganic material from collected manure to produce an initial organic product; facilitating the decomposition activity of anaerobic and facultative anaerobic bacteria by, at a temperature in the range of fifty degrees F to one hundred and five degrees F, adding water to the initial organic product to produce a secondary organic product comprising slurry including seventy-five to ninety-five percent by weight water and twenty-five to five percent by weight of the organic material, avoiding the introduction in the initial organic product of chemical compositions that injure the living anaerobic and facultative anaerobic bacteria in the initial organic product, and producing, while preserving a significant proportion of the living anaerobic and facultative anaerobic bacteria in the secondary organic product, a tertiary organic product by processing the secondary organic product to separate the organic material in the secondary organic product into particles having a length in the range of one micron to one-eighth of an inch; and, removing, at a temperature in the range of fifty degrees F to one hundred and five degrees F and while preserving a significant proportion of the living anaerobic and facultative anaerobic bacteria in the tertiary organic product, small pieces of the inorganic material from the tertiary organic product to produce a quaternary organic slurry product comprised of less than twenty-five percent by weight of said organic material; transporting the quaternary organic slurry product to a digestor; and, permitting the anaerobic and facultative anaerobic bacteria in the quaternary organic slurry product to decompose organic material in said quaternary organic product.

Turning now to the drawings, which depict the presently preferred embodiment of the invention for the purpose of illustration and not by way of limitation of the scope of the invention, FIG. 1 illustrates a method including the step 20 of "providing an animal processing facility, step 21 of "collect selected organic waste", step 22 "remove large pieces of inorganic material while preserving anaerobic and aerobic bacteria", step 23 of "increase surface area of organic waste to promote bacteria growth", step 24 "add floculants", step 25 "add water to produce slurry", step 26 "separate solid organic material", step 27 "screw press", step 28 "centrifuge", step 29 "disks", step 30 "separate fluid", step 31 "local digestor" and step 32 "remote digestoer".

In step 20, the animal processing facility can comprise a factory in which animals like cattle, pgs, and chickens are slaughtered and processed to produce meat and other products, can comprise a concentrated animal feeding operation (CAFO), or can comprise another agricultural operation in which a large number of animals are raised or fed or slaughtered or otherwise processed. As used herein, an animal processing facility raises, feeds, slaughters or otherwise processes at least five hundred animals a month. Any kind of animal manure can be utilized in the processing system of the invention.

In step 21, animal waste collected includes manure and can include other organic material such as urine, rumen, skin, bones, hoofs, and fur or hair. The organic waste also includes inorganic material such as sand, clay, rocks, sticks, stones, calcium carbonate, or other material. Finally, the organic material also includes living anaerobic and aerobic bacteria. If organic animal waste is allowed to age for an extended period, the mix or kinds of live bacteria in the waste may change. Consequently, animal waste, in particular the organic waste component of animal waste, is preferably collected at at least seven day intervals (i.e., there is seven days or less between each collection), preferably collected at at least four day intervals, and most preferably is collected daily. Bacteria that are particularly desirable in the decomposition of manure are anaerobic and facultative anaerobic bacteria. These bacteria are desirable because of the by-products they produce during the decomposition of manure. If organic waste is allowed to freeze, the mix or kinds of live bacteria in the waste may change. Consequently, organic waste is most preferably collected at ambient temperatures above freezing and before the organic waste freezes. If particular cleaning chemicals are utilized to clean concrete or other floor surfaces in an animal processing facility, the chemicals may kill or injure live bacteria in manure that contacts the floor surfaces.

In step 22, large pieces of clay, rocks, sticks and other inorganic material are removed from the collected animal waste. If desired, large pieces of bones and hoofs or other organic material can be removed. As used herein, a large piece of organic or inorganic material is a piece that is at least one-half of an inch long, i.e., the greatest dimension of the piece of material is at least one-half of an inch. As used herein, a small piece of inorganic material is a piece that is less than one-half of an inch long, i.e., the greatest dimension of the piece of inorganic material is less than one-half of an inch.

Importantly, when large pieces of material are removed from the animal waste, the removal process must preserve living anaerobic and aerobic bacteria in the organic waste that remains after the large pieces of material are removed. Another object of the removal process is to minimize the amount of manure (or other desired organic material) that is removed from the animal waste, to maximize the amount of manure (or other desired organic material) remaining in the animal waste, to minimize the amount of organic material other than manure that remains in the animal waste, and to minimize the amount of inorganic material that remains in the animal waste. As used herein, living bacteria are preserved if they are not killed during the removal of large pieces of material in step 22 (or steps 21, 23, 25, 26, 29, 30). Further, it is preferred that the bacteria not only remain alive, but that they are not otherwise injured during step 22. As used herein, bacteria are not injured if they are deemed healthy and the physiological systems of the bacteria are generally operating normally. In step 22, large pieces of material typically are removed by perforated mesh, screens, revolving trammels, grizzly cages, or spaced bar devices. As used herein, the term anaerobic bacteria includes obligate anaerobic bacteria and aerotolerant anaerobic bacteria. The term anaerobic bacteria does not include facultative anaerobic bacteria. Facultative anaerobic bacteria can utilize oxygen whereas anaerobic bacteria can not.

In step 23 the surface area of organic waste is increased to promote the growth of bacteria. Importantly, step 24 preferably is not accomplished in the process of the invention. Floculants are not added to the organic waste because floculants typically injure or interfere with the functioning of bacteria.

Step 25 is, however, carried out. Water, or another desired aqueous liquid such as waste milk, urine, or rain water is admixed to the organic waste to produce an organic waste slurry. The amount of water added is sufficient to produce an organic waste slurry that is 75% to 95% by weight water, preferably 75% to 90%, by weight water, and 5% to 25% by weight organic material. Mixing of the water with the organic waste is accomplished by turbulence that occurs when water is directed into the organic waste, is accomplished with a mechanical mixer, or is accomplished by any other desired process. The water functions to separate the organic waste into smaller components and, consequently, to increase the surface area of the organic waste available to bacteria that function to decompose the organic material. This improves the operating environment of the bacteria, particularly anaerobic bacteria which thrive in the absence of oxygen. Although water does contain some oxygen, it produces a closed environment which facilitates the functioning of anaerobic and facultative anaerobic bacteria. After facultative bacteria consume any oxygen in the water, they can begin functioning as anaerobic bacteria, i.e., without consuming oxygen.

In step 26, the surface area of organic material in the organic waste slurry can be further reduced by directing the slurry into separation equipment 29 that includes a fixed housing and one or more discs spinning in the housing. Slurry input into the housing impinges the spinning disks and the rotational forces generated by the disks facilitate separation of solid and liquid fractions from the slurry and facilitate the separation of organic material into smaller sized particles. The (1) speed of rotation of the discs, (2) the shape of the fixed housing, and (3) the difference, if any, between the diameters of the discs and width or diameter of the fixed housing can be adjusted as desired. When two or more adjacent housings (each with spinning disks therein) are utilized, material can flow from one housing to the other and the flow rate from one housing to the other can be adjusted as desired to facilitate the removal of desired fractions from the slurry. Disk-fixed housing equipment can, in accordance with step 26, be utilized to remove inorganic material from the organic waste slurry so that silica, clay, sand, gravel, oyster shell, and other inorganic particles are substantially removed and the organic waste material that is discharged from the disk-fixed housing equipment is a discharge slurry or fraction consisting of water (or another aqueous liquid) and organic material, where the organic material is less than 25% by weight, preferably less than 15% by weight, more preferably less than 12% by weight, and most preferably less than 6% by weight of the discharge slurry, with the remainder of the discharge slurry substantially comprising water. The organic material in the discharge slurry is preferably manure. The amount of silicates, clay, and other inorganic material in the discharge slurry comprises a minor amount of the discharge slurry and is preferably less than 0.5% by weight, more preferably less than 0.1% by weight, and most preferably less than 0.01% by weight. It is possible, albeit unlikely, that the original slurry introduced into the disk-fixed housing equipment is basically 75% by weight water and 25% by weight organic material. But even in this event there likely is a small fraction of silica, clay or other inorganic material, possibly 0.5% or less by weight, that can be at least partially removed by the disk-fixed housing equipment.

The discharge slurry functions as liquid stock for a digestor and can be pumped directly from separation equipment 29 into a digestor. There apparently was, prior to the invention, no known process for producing liquid stock with significant quantities of viable anaerobic and facultative anaerobic bacteria in a single pass through separation equipment. Procedures considered for many years in the market place either would kill or significantly harm the bacteria or were not economically feasible. Removing most inorganic particles from the organic waste material is desirable because the majority of material that remains is manure and is susceptible to bacterial decomposition and because it reduces the frequency with which a digestor must be taken off line and reconditioned.

Disk-fixed housing equipment can, in accordance with step 30, also be utilized to remove liquid from the organic waste slurry. One circumstance in which it may be desirable to remove liquid is when it is desired to transport the slurry to a remote location. In this event, it may be desirable to remove enough liquid to significantly reduce the weight of the remaining organic material while leaving sufficient liquid to insure the survival of anaerobic, facultative anaerobic, and aerobic bacterial in the remaining organic material.

After water is admixed in step 25, the resulting slurry can be directed into separation equipment 29 to both separate solid inorganic material and separate out fluid in the same step. The disk-fixed housing equipment can, for example, remove both a fraction comprising a liquid and a fraction comprising solid particulate.

The speed at which slurry is directed into disk-fixed housing separation equipment and against a disk in the separation equipment can vary widely without killing or injuring significant proportions of anaerobic, facultative anaerobic, or aerobic bacteria. A significant proportion of anaerobic, facultative anaerobic, or aerobic bacteria are not killed during step 29 (or steps 21, 22, 23, 25, 26, 30) if no more than 50%, preferably no more than 35% and most preferably no more than 20% are killed. As noted above, bacteria are not injured if they are deemed healthy and the physiological systems of the bacteria are deemed to be generally operating normally.

The speed at which disks rotate in disk-fixed housing separation equipment can vary widely without killing or injuring anaerobic or aerobic bacteria.

An example of one general structure of disk-fixed housing separation equipment that can be utilized in the practice of the invention is depicted in U.S. Pat. No. 6,973,980. One advantage of the disk-fixed housing equipment is that the waste material input into the equipment need not be homogenized. Another advantage is that it can tolerate changes in flow rate. Another advantage is that is can remove lipids and fatty acids.

Other separation equipment can, if desired, be utilized in place of the disk-fixed housing equipment. Such alternative separation equipment should not function to compress organic material, should not require the use of chemicals which injure the bacteria in the organic material, should not operate at a temperature or pressure which can injure the bacteria, should facilitate increasing the surface area of the organic material, and should permit the addition of significant amounts of water or another fluid to organic waste material that is collected from an animal processing facility.

Screw presses and centrifuges are widely utilized to process material.

However, step 27 is preferably not utilized in the practice of the invention because a screw press compresses material and does not efficiently separate inorganic from organic material and because a screw press typically requires a composition with more than 50% solids.

And, step 28 preferably also is not utilized in the practice of the invention because a centrifuge typically requires a composition with less than twenty percent solids.

Organic material produced by disk apparatus 29 is transported to a local digestor 31 or to a remote digestor 32. The size of organic material particles produced by apparatus 29 is in the range of one micron to one-eighth of an inch, preferably one micron to five hundred microns, and most preferably one micron to two hundred and fifty microns. Anaerobic, facultative anaerobic, and aerobic bacteria in the organic material function to decompose the organic material while the organic material is in digestor 31 or 32.

Each of the steps in FIG. 1 is performed at a temperature which does not threaten the viability of bacteria in the organic waste material. This temperature is in the range of fifty to one hundred and five degrees F, preferably sixty to eighty-five degrees F.

Having described our invention in such terms as to enable those of skill in the art to make and use the invention, and having described the presently preferred embodiments thereof,

We claim:

1. A method for preparing an organic composition for a digester to minimize injury to and enhance the decomposition function of anaerobic and facultative anaerobic bacteria in the organic composition, said method comprising the steps of
   (a) providing an animal processing facility;
   (b) periodically collecting at least seven day intervals and at an ambient temperature greater than 32° F. manure produced at the animal processing facility, said manure including organic material, inorganic material, and living anaerobic and facultative anaerobic bacteria that function to decompose said organic material;
   (c) removing, while preserving a significant proportion of the living anaerobic and facultative anaerobic bacteria in the manure, large pieces of said inorganic material from collected manure to produce an initial organic product;
   (d) facilitating the decomposition activity of anaerobic and facultative anaerobic bacteria by, at a temperature in the range of 50° F. to 105° F.
      (i) adding water to said initial organic product to produce a secondary organic product comprising slurry including 75% to 95% by weight water and 25% to 5% by weight of said organic material,
      (ii) avoiding the introduction in said initial organic product of chemical compositions that injure the living anaerobic and facultative anaerobic bacteria in said initial organic product, and
      (iii) producing, while preserving a significant proportion of the living anaerobic and facultative anaerobic bacteria in said secondary organic product, a tertiary organic product by processing said secondary organic product to separate said organic material in said secondary organic product into particles having a length in the range of 1 μm to ⅛ inch; and,
   (e) removing, at a temperature in the range of 50° F. to 90° F. and while preserving a significant proportion of the living anaerobic and facultative anaerobic bacteria in said tertiary organic product, small pieces of said inorganic material from said tertiary organic product to produce a quaternary organic slurry product comprised of less than 25% by weight of said organic material;
   (f) transporting said quaternary organic slurry product to a digester; and
   (g) permitting said anaerobic and facultative anaerobic bacteria in said quaternary organic slurry product to decompose in said digester organic material in said quaternary organic product.

* * * * *